(12) United States Patent
Totaro et al.

(10) Patent No.: US 10,449,734 B2
(45) Date of Patent: Oct. 22, 2019

(54) METHODS FOR MANUFACTURING ELONGATED STRUCTURAL ELEMENTS OF COMPOSITE MATERIAL

(71) Applicant: ALENIA AERMACCHI S.p.A., Rome (IT)

(72) Inventors: Giuseppe Totaro, Foggia (IT); Gianni Iagulli, Foggia (IT)

(73) Assignee: Alenia Aermacchi S.p.A., Rome (IT)

( * ) Notice: Subject to any disclaimer, the term of this patent is extended or adjusted under 35 U.S.C. 154(b) by 667 days.

(21) Appl. No.: 14/856,607

(22) Filed: Sep. 17, 2015

(65) Prior Publication Data

US 2016/0083069 A1 Mar. 24, 2016

(30) Foreign Application Priority Data

Sep. 18, 2014 (IT) .............................. TO2014A0739

(51) Int. Cl.
*B29C 70/44* (2006.01)
*B29C 70/34* (2006.01)
(Continued)

(52) U.S. Cl.
CPC .......... *B29C 70/446* (2013.01); *B29C 33/505* (2013.01); *B29C 33/68* (2013.01); *B29C 65/002* (2013.01); *B29C 65/02* (2013.01); *B29C 66/0042* (2013.01); *B29C 66/1122* (2013.01); *B29C 66/1222* (2013.01);
(Continued)

(58) Field of Classification Search
CPC .. B64C 1/061; B64C 1/64; B64C 1/65; B64C 3/18; B29C 33/505; B29C 33/68; B29C 65/002; B29C 65/02; B29C 66/0042; B29C 66/1122; B29C 66/1222; B29C 66/1224; B29C 66/131; B29C 66/4344; B29C 66/43441; B29C 66/474; B29C 66/49; B29C 66/54; B29C 66/63; B29C 66/721; B29C 66/73752; B29C 66/8122;
(Continued)

(56) References Cited

U.S. PATENT DOCUMENTS

| 4,721,593 A * | 1/1988 | Kowal ................... B29C 70/44 |
| | | 156/156 |
| 2008/0116618 A1* | 5/2008 | Martin .................. B29C 33/40 |
| | | 264/480 |

(Continued)

FOREIGN PATENT DOCUMENTS

EP 0862978 A1 9/1998
EP 2303560 A2 4/2011
(Continued)

OTHER PUBLICATIONS

Machine translation of FR2970432 date unknown.*

*Primary Examiner* — John L Goff, II
(74) *Attorney, Agent, or Firm* — Meunier Carlin & Curfman LLC

(57) ABSTRACT

Methods for manufacturing elongated structural elements are provided. Such methods provide composite material having optimal properties such as weight and strength which can be produced at much lower costs compared to conventional methods. Composite materials including such elements are also provided. In addition, commercial products incorporating such structural elements are provided.

1 Claim, 4 Drawing Sheets

(51) Int. Cl.

| | |
|---|---|
| *B29C 33/50* | (2006.01) |
| *B29C 33/68* | (2006.01) |
| *B29D 99/00* | (2010.01) |
| *B29C 65/00* | (2006.01) |
| *B64C 1/06* | (2006.01) |
| *B64C 3/18* | (2006.01) |
| *B29C 65/02* | (2006.01) |
| *B29L 31/30* | (2006.01) |

(52) U.S. Cl.
CPC ........ *B29C 66/1224* (2013.01); *B29C 66/131* (2013.01); *B29C 66/4344* (2013.01); *B29C 66/43441* (2013.01); *B29C 66/474* (2013.01); *B29C 66/49* (2013.01); *B29C 66/54* (2013.01); *B29C 66/63* (2013.01); *B29C 66/721* (2013.01); *B29C 66/73752* (2013.01); *B29C 66/8122* (2013.01); *B29C 66/81455* (2013.01); *B29C 70/342* (2013.01); *B29D 99/0003* (2013.01); *B29D 99/0014* (2013.01); *B64C 1/061* (2013.01); *B64C 1/064* (2013.01); *B64C 1/065* (2013.01); *B64C 3/18* (2013.01); *B29C 66/8322* (2013.01); *B29K 2883/00* (2013.01); *B29L 2031/3076* (2013.01); *B29L 2031/3082* (2013.01); *B29L 2031/3085* (2013.01); *Y02T 50/43* (2013.01)

(58) Field of Classification Search
CPC ............ B29C 66/81455; B29C 70/342; B29C 70/446; B29D 99/0003; B29D 99/0014
See application file for complete search history.

(56) References Cited

U.S. PATENT DOCUMENTS

| | | | | |
|---|---|---|---|---|
| 2009/0317587 | A1* | 12/2009 | Deobald | B29C 70/865 |
| | | | | 428/119 |
| 2010/0024964 | A1* | 2/2010 | Ingram, Jr. | B29C 53/587 |
| | | | | 156/189 |
| 2010/0186899 | A1* | 7/2010 | Jackson | B29C 33/10 |
| | | | | 156/382 |
| 2011/0226407 | A1* | 9/2011 | Inserra Imparato | B29C 70/44 |
| | | | | 156/196 |
| 2014/0341641 | A1* | 11/2014 | Stawski | B32B 37/1009 |
| | | | | 403/265 |

FOREIGN PATENT DOCUMENTS

| | | | | |
|---|---|---|---|---|
| EP | 2479014 | A1 * | 7/2012 | ............ B29C 43/10 |
| EP | 2777916 | A1 | 9/2014 | |
| FR | 2970432 | A1 | 7/2012 | |
| WO | WO-2010143212 | A1 * | 12/2010 | ............ B29C 70/34 |

* cited by examiner

METHODS FOR MANUFACTURING ELONGATED STRUCTURAL ELEMENTS OF COMPOSITE MATERIAL

CROSS REFERENCE TO RELATED APPLICATION

This application claims priority to and benefit of Italian Patent Application No. TO2014A000739 (which corresponds to Italian Patent Application No. 102014902294265 under the new numbering system which was introduced in 2015 with the implementation of the IPTO online filing platform) filed Sep. 18, 2014, the contents of which are incorporated by reference in their entirety.

FIELD OF THE INVENTION

The present invention relates to the field of aircraft construction in general and refers more specifically to methods for manufacturing elongated structural elements of composite material, such as wing and empennage spars, fuselage stringers, and beams in general. Methods according to the present invention may be applied to structural elements having at least one node between a flange and a web. More particularly, but not exclusively, the present method may be applied to the manufacture of beams or spars having a cross section in the form of a double T (or H), T, or J, and to co-cured monolithic components having stiffenings with the aforesaid cross sections, such as multi-spar boxes or stiffened panels.

BACKGROUND OF THE INVENTION

FIG. 11 shows a step in the manufacture of a spar or beam of composite material with a double T cross section, according to a conventional method. The spar is initially assembled in an uncured state, by bringing together the webs of two profiled components 15, 16 with cross sections in the form of opposed C-shapes. Fillers F of carbon fibre and/or structural adhesive, with a pseudo-triangular cross section, are then applied along the longitudinal recesses R which are present along the junction areas between the webs and flanges of the two profiled sections.

Problems have arisen concerning the quality of the junction areas (or "radial" areas) of the spars, owing to the geometrical imprecision of the fresh (uncured) fillers. The imprecision may be due to the filler production process, which is usually carried out by vacuum forming or extrusion. Conventional fillers cannot repeatedly provide the geometrical precision (in terms of radii and thicknesses) specified on the drawings of components which are to be cured on the filler. In other cases, the imprecision may be seen after the step of co-curing with the other components of the spar, with the appearance of wrinkles, accumulations of resin (called "resin pockets") and fibre distortion. This has led to an increase in rejects, repairs and structural operations in support of the evaluation of the acceptability of the various types of defects encountered.

Moreover, the presence of fillers in the nodes of beams makes it difficult to inspect the radial areas of the spars with ultrasonic methods, since it disperses the signal.

The filler is an integral part of the beam or spar. Its use is dictated by the need to fill the cavity in the junction area to enable the radii of the spars to be compacted correctly during the autoclave curing, which takes place under pressure in vacuum bags. The filler provides a "support" or "reaction" function without which the beam would collapse in the radial area under the action of the pressure of the autoclave and the vacuum bag. The reactive force exerted by the filler also allows correct curing of the C-section profiled components in the radial area, thereby ensuring the absence of porosity.

SUMMARY OF THE INVENTION

The present invention provides methods of manufacturing beams of composite material having an optimal weight, while also avoiding the drawbacks discussed above. More particularly, methods disclosed and claimed herein provide lighter beams for a given structural loading, reducing the direct costs of production (the cost of materials and labour for producing a conventional filler), improving the geometrical quality of the beam in the junction (radial) or node area, simplifying the steps of non-destructive testing, and reducing the non-recurring costs of managing typical defects in the region of the filler.

The present invention is based on the fact that, in structural terms, the filler usually only serves a marginal purpose: the two C-shaped sub-elements are designed to bear the whole of the load specified for the beam, and the filler is therefore an element which essentially provides increased weight.

The aforesaid objects and advantages as well as others, which will be more fully evident from the following text, are achieved according to the present invention described and claimed herein.

To summarize briefly, instead of applying conventional fillers, one or more resilient inserts are inserted into the nodal junction areas between the web and the flanges of an elongated structural element. At the end of the curing (polymerization) step, the inserts are extracted from the cured structural element, leaving cavities extending longitudinally through the respective nodal areas. The structural and functional characteristics of embodiments of methods according to the invention will now be described by reference to the following figures.

DETAILED DESCRIPTION

Figure 1:
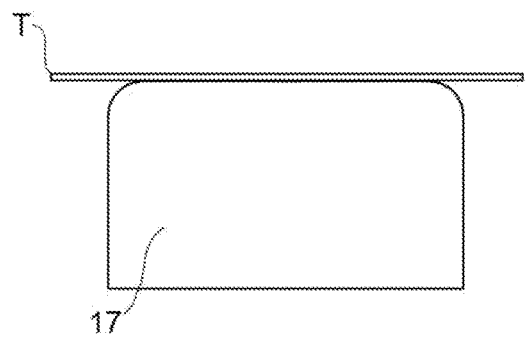
FIGS. 1 to 5 are cross-sectional views which schematically illustrate steps in the assembly of a structural element according to an embodiment of the invention.

Before the detailed explanation of a plurality of embodiments of the invention is given, it must be made clear that the invention is not limited in its application to the details of construction and the configuration of the components presented in the following description or illustrated in the drawings. The invention can be applied in other embodiments and can be used or implemented in different ways in practice.

Figure 6:
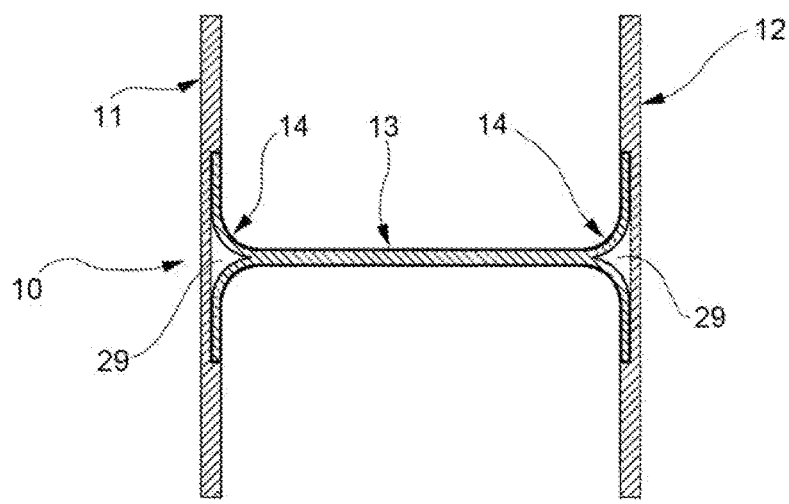
FIG. 6 is a cross-sectional view of a structural element according to an embodiment of the invention.

The methods described below relate to the manufacture of an elongated structural element 10 (FIG. 6), which in this example is a beam or spar. The spar may have a "double T" (or H) cross section, having two parallel flanges 11, 12 and a central web 13 extending at a right angle with respect to the flanges. The double T (or H) shape is not to be interpreted as limiting. More generally, the present methods may be used for manufacturing structural elements elongated in a longitudinal direction, such as beams, spars, stringers, multi-spar boxes, or stiffened panels with cross sections of any shape, provided that they have at least one node or nodal area 14 extending longitudinally along a junction area between a flange and a web.

Figure 9:
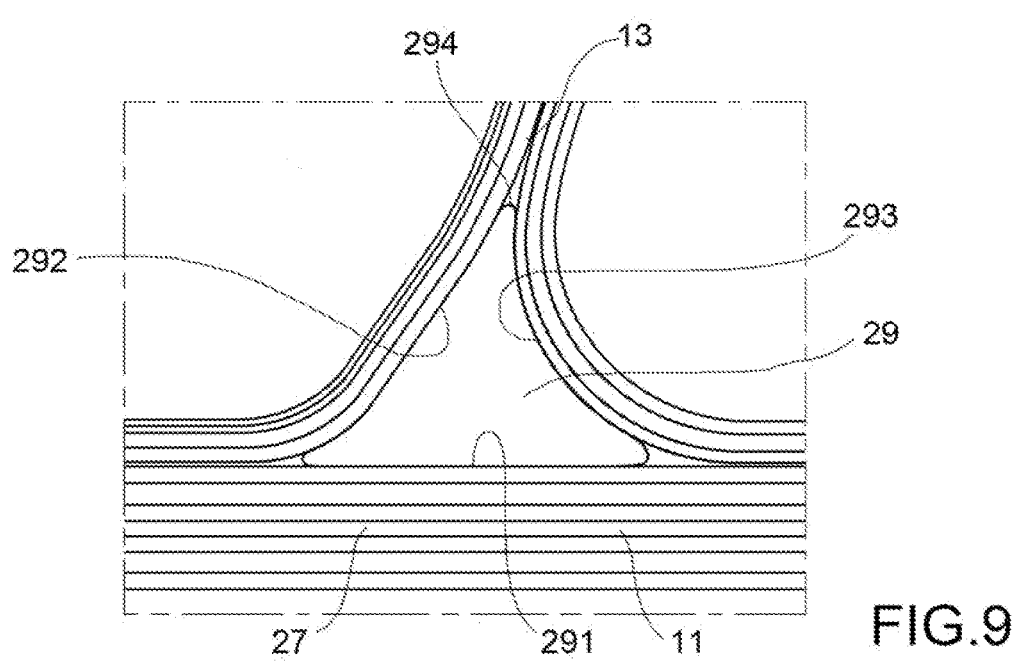
FIGS. 9 and 10 are partial schematic views of nodal areas of structural elements manufactured according to an embodiment of the invention.
Figure 10:
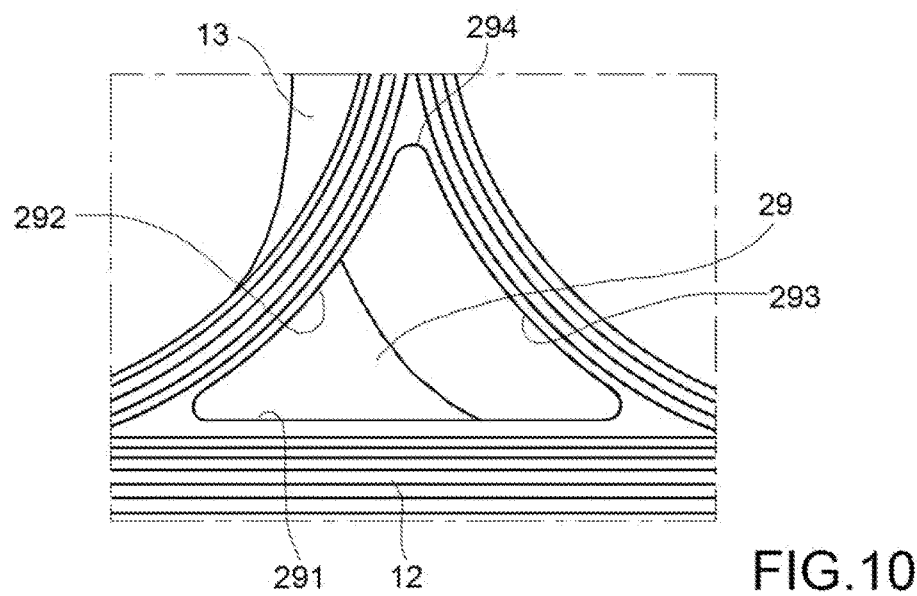
Figure 11:
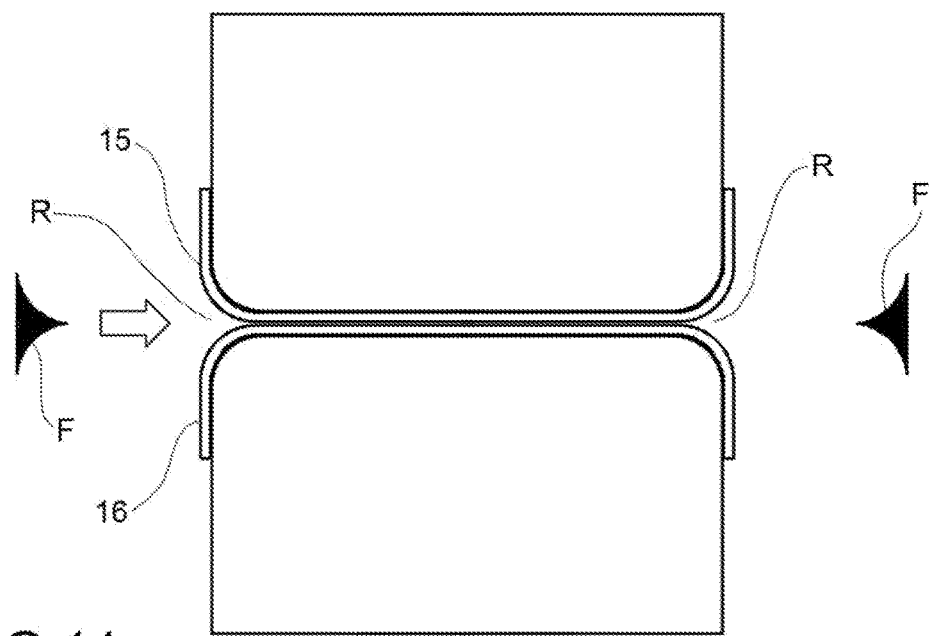
FIG. 11 is a schematic cross-sectional view of a step in the assembly of a structural element according to the prior art.

The web extends in a direction which can form a right angle, or two angles other than 90°, with the flange (or flanges). In the example of FIG. 9, the web 13 extends in a direction which forms two supplementary angles other than 90° with the flange 12. As understood in this text, terms and expressions indicating orientations such as "longitudinal" and "transverse" relate to the longitudinal direction of extension of the elongated structural element (beam, or spar, or stringer, or multi-spar box, or stiffened panel).

Figure 2:
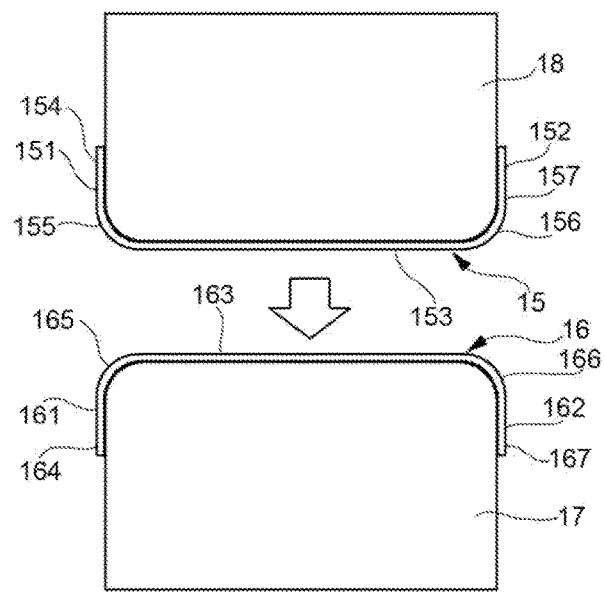

In a known preliminary process, two profiled sections of composite material are initially preformed, these sections extending in a longitudinal direction and having C- or U-shaped cross sections. A preliminary step (FIG. 1) may involve the lamination of fabrics T preimpregnated with resin, which are thermoformed on two respective mandrels 17, 18 (FIG. 2), to produce two profiled components 15, 16 having cross sections in the form of opposed C- or U-shapes.

In this embodiment, each profiled section 15, 16 has two parallel flange portions 151, 152 and 161, 162, joined, respectively, to two web portions 153, 163 by means of a respective radiused portion 155, 156 and 165, 166. In each profiled section 15, 16, the parallel flange portions 151, 152 and 161, 162 have respective outer surfaces 154, 157 and 164, 167 facing in transversely opposed directions.

In one embodiment (not shown) of the method, for the manufacture of a structural element with a T-shaped cross section, the profiled sections 15 and 16 may have L-shaped cross sections, including a single flange portion 151, 152 joined, respectively, to a web portion 153, 163 by means of a respective radiused portion 155, 165. The angle formed between the web and the flange may be either 90° or another angle.

The two profiled sections 15, 16 are assembled by bringing their web portions 153, 163 together. The two junctions extending longitudinally to the junctions between the web of the spar and the two flanges are defined as nodal areas or nodes.

Figure 3:
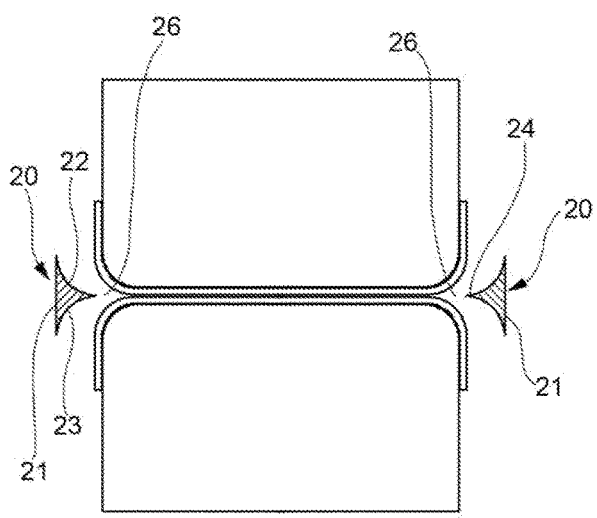
Figure 7:
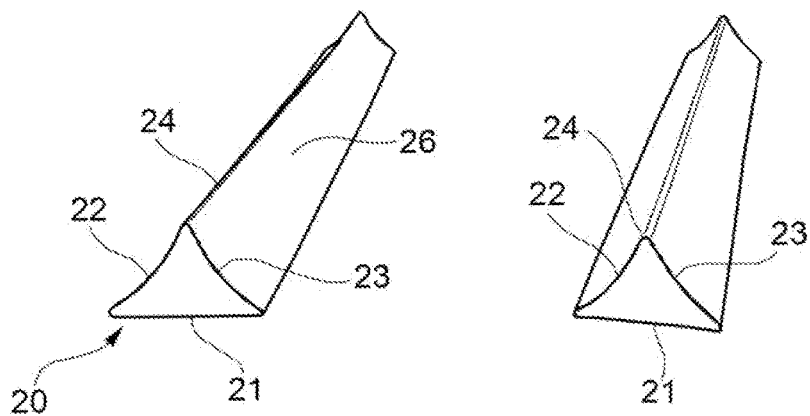
FIGS. 7 and 8 are perspective views which show resilient inserts that can be used to implement manufacturing methods according to certain embodiments of the invention.
Figure 8:
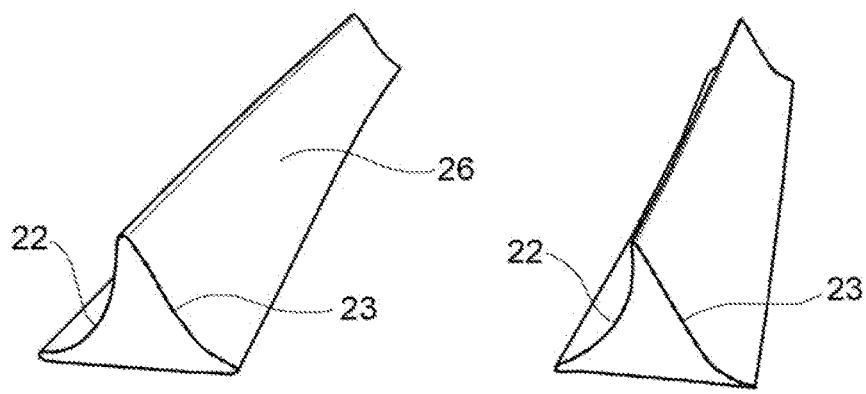

For each nodal area, a respective removable or extractable insert 20 is prepared, having a substantially pseudo-triangular cross section in which an essentially flat base 21 and two other sides 22, 23 can be distinguished, the two other sides converging to form a vertex or apex 24 (FIGS. 3, 7 and 8).

In certain embodiments, the two sides 22, 23 are curved and concave, with curvatures mating with, or corresponding to, the radiused portions of the first 15 and second 16 profiled section. Consequently, the vertex or apex formed at the junction of the curved sides 22, 23 is substantially cusp-shaped (FIGS. 3, 7 and 8).

Two inserts 20 may be prepared for the manufacture of a double T beam which has two nodal areas. The curved sides 22, 23 may have curvatures mating with the respective convex (or radiused) junction surfaces between the web portions and the flange portions of the profiled sections 15, 16.

According to one embodiment of the method, for the manufacture of a beam or spar having its web perpendicular to the flange, the two concave curved sides 22, 23 may be symmetrical about a theoretical plane of symmetry which runs through a mid-line of the base 21 and is perpendicular to the base (FIG. 7).

According to one embodiment, for the manufacture of a beam or spar where the web forms angles other than 90° with the flange, the two concave curved sides 22, 23 are asymmetrical (FIG. 8).

The inserts 20 may be made of resilient material such as pre-cured silicone rubber.

Suitable materials which may be selected for the extractable inserts may include, for example, polysiloxanes (polymerized siloxanes), such as the type known as HTV (High Temperature Vulcanizing), which are vulcanized at high temperatures that cannot be reached during the process of curing the composite materials (carbon resin). Experimental tests conducted by the applicant have demonstrated that excellent results can be achieved by using inserts made of silicone rubber of the vinyl-methyl-polysiloxane (VMQ) type belonging to siloxane group Q according to the ISO 1629 standard (derived from ASTM 1418-79). In this specific case, the elastomer used has the following chemical, physical and mechanical properties which are considered to be optimal: specific weight, $1.200+0.020$ g/cm$^3$, Shore A hardness 70+5, minimum breaking strength 8 MPa, minimum breaking strain 250%, minimum tear strength 15 kN/m, compression set sch. 25% at 175° C., 40% maximum. However, these values are not to be interpreted as definitive or limiting and are simply provided as evidence of the excellent properties obtained by methods according to the present invention.

In one embodiment, the extractable insert 20 is produced by extrusion.

In other embodiments, the extractable insert 20 is coated with an outer layer 25 (FIGS. 7 and 8) having properties that facilitate its separation from the cured composite material. The outer layer 25 may be conveniently made of adhesive tape based on PTFE (Teflon) or other release materials acceptable in the specific conditions of the relevant process.

As shown in FIG. 3, the first profiled section 15 and the second profiled section 16 are preassembled together, the web portion 153 of the first profiled section 15 being brought against the web portion 163 of the second profiled section 16. In this condition, the flange portions 151, 152 of the first profiled section 15 extend in opposite directions from the directions in which the flange portions 161, 162 of the second profiled section extend, and lie in pairs in two parallel planes. The radiused portions 155, 156 of the first profiled section 15 may be each adjacent to a respective radiused portion 165, 166 of the second profiled section 16, so as to form, on each of the two opposed longitudinal sides of the profiled sections, a respective recess 26 extending longitudinally along the nodal areas.

Figure 4:
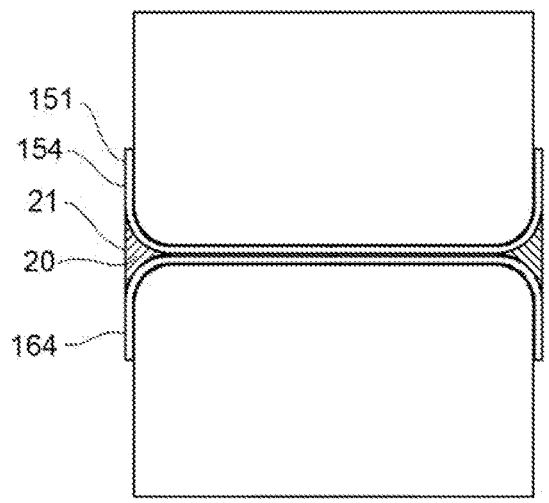

The inserts 20 are applied (FIG. 4) along the longitudinal recesses 26. The ridges or apexes 24 are inserted into the innermost areas of the recesses 26, while the flat bases 21 remain facing in opposed outward directions.

According to one embodiment, the inserts 20 may be designed so that their flat bases 21 lie substantially flush with the outer surfaces 154, 164 and 157, 167 of the flange portions 151, 152, 161, 162 of the profiled sections 15 and 16.

If necessary, flat laminated layers of composite material then may be applied (FIG. 5) so as to form two respective bases 27, 28, flat in this example, of the structural element. The layers of the bases 27, 28 may extend to cover the outer surfaces 154, 164 and 157, 167 of the flange portions and the flat bases 21 of the inserts.

In a different embodiment (not shown), for the manufacture of a structural element with a T-shaped cross section, only one base 27 may be provided.

Figure 5:
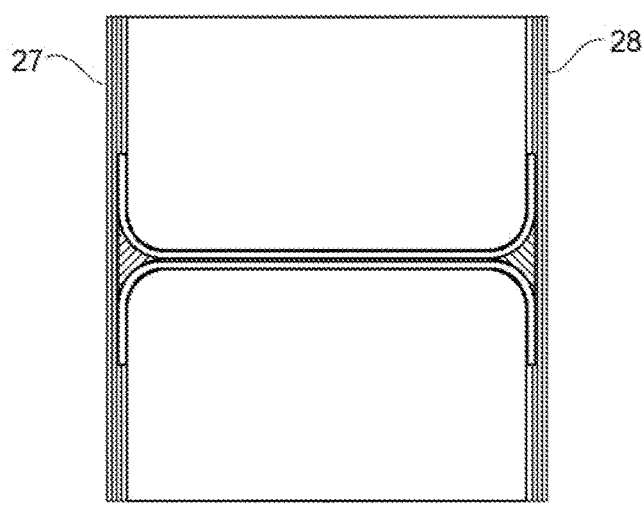

The assembly shown in FIG. 5 then may be enclosed between two flat forming or stamping tools (not shown) for imparting a flat shape to the layers of the bases 27, 28, and can be enclosed in a vacuum bag according to known procedures which will not be described here. The assembly is then transferred to an autoclave and subjected to specified temperature and pressure cycles to cause the curing of the resin present in the composite material.

After the autoclave curing, the cured structural element may be allowed to cool to ambient temperature.

Each insert 20 is then extracted from the spar by simply pulling it from one end; this leaves a longitudinally extending cavity 29 in each nodal area, having the shape and dimensions of the respective insert.

During the curing process, the extractable insert 20 undergoes transverse thermal expansion as a result of the temperature rise. This reversible thermal expansion is stronger than the external compressive forces to which the beam is subjected, represented by the vacuum applied by the vacuum bag and the pressure within the autoclave.

On completion of curing, the structural element is allowed to cool, in order to enable the insert or inserts 20 to contract thermally. Since the contraction of the resilient inserts is greater than the contraction of the cured composite material, it causes the cross section of the cavities 29 formed in the structural element to be slightly wider transversely (by a few tenths of a millimeter) than the transverse dimensions of the respective inserts at ambient temperature; this facilitates the extraction of the rubber insert after curing, avoiding the risk that the insert might remain trapped in the beam. To allow for the aforementioned thermal expansion undergone by the silicone insert during the thermal cycle of curing the composite, at the design stage its cross section is appropriately reduced by a percentage of 4% to 6% of the theoretical cross section which the composite beam is intended to have.

Another effect of the compressive strength of the material of the insert 20, combined with its transverse thermal expansion, is its capacity to consolidate in an optimal way the composite material located between the insert and the external vacuum bag (not shown). This prevents the appearance of defects in the laminated solid (porosity and fibre deviation) and in the geometry of the component (distortion, thickness variation, and resin pockets).

Embodiments of the invention provide monolithic elongated structural elements which are free of filler ("fillerless") and which have at least one web and at least one flange lying on a given geometric plane, and a nodal area extending along a junction between the web and the flange. The structural element forms a longitudinal cavity which extends longitudinally through the nodal area and has a substantially triangular cross section having a substantially flat first side 291 parallel to the geometric plane on which the flange lies and two convex curved sides 292, 293 with their convexities facing the centre of the cavity 29. The curved sides converge in a vertex 294 which extends in an end area of the web. In certain embodiments, the vertices of the triangular cross section may be rounded.

Exemplary embodiment described up to this point relate to methods of assembly by co-curing, in which a composite laminate is polymerized ("cured") and simultaneously joined ("bonded") to one or more components of uncured composite material. All the resins of the composite material and the structural adhesives applied to the interface of the components to be joined together may be polymerized in the same curing step.

Alternative embodiments provide for the form of assembly known by the term "co-bonding", in which two or more components are joined together, at least one of the components being fully cured, while at least one other component is uncured. Therefore, at least one of the components of the structural element, that is to say the profiled sections 15, 16 and the bases 27, 28, may have been cured previously, while at least one of the other components is uncured.

Both the aforesaid co-curing and co-bonding applications also can be used for incorporating a plurality of stiffeners into composite structural panels.

These methods enable appreciable cost reductions to be achieved, including a reduction in the cost of the material for producing the conventional composite filler (depending on the length of the structural element and the cross section of the filler). A further reduction relates to the cost of the time required to manufacture conventional fillers and of the automatic machinery for their preparation. These savings are due in part to the recyclability of the extractable inserts 20.

These methods provide a considerable reduction in the weight of the finished structural element. Furthermore, the methods improve the geometric tolerances in the radial area in comparison to conventional processes: the radii have a regular curvature and the values of the radius lie within narrow tolerance ranges, with an absence of fibre distortions (wrinkles) in the radial area and accumulations of resin, thereby also simplifying the steps of non-destructive (ultrasonic) inspection (NDI) in the radial areas.

Various aspects and embodiments of methods according to the invention have been described. With the exception of the choice between co-curing and co-bonding, each embodiment may be combined with any other embodiment. Furthermore, the invention is not limited to the embodiments described, but may be modified by a person skilled in the art based on the teachings herein while still falling within the scope of the claims which follow.

What is claimed is:

1. A method of manufacturing a structural element of composite material elongated in a longitudinal direction and having at least one web and at least one flange and a nodal area extending along a junction between the web and the flange, the method comprising the steps of:
   providing at least three components of composite material, at least one of which is uncured, wherein the three components include
      a first component having at least a flange portion, a web portion and at least one first radiused portion joining the flange portion to the web portion,
      a second component having at least a flange portion, a web portion and at least one second radiused portion joining the flange portion to the web portion,
      at least one third component having a flat base;
   preassembling the first and second components by bringing the web portion of the first component against the web portion of the second component, in such a way that the flange portions of the first and second components extend in opposite directions and lie in the same plane, and the radiused portions of the first and second components are adjacent and together form a longitudinally extending recess;

providing at least one removable resilient insert made of pre-cured silicone rubber of the vinyl-methyl-polysiloxane (VMQ) type belonging to siloxane group Q according to the ISO 1629 standard, said insert being produced by extrusion and having a substantially triangular or pseudo-triangular full, non-hollow, not inflatable cross section with a flat base and two other sides converging into a ridge, wherein said other two sides have shapes mating with the respective radiused portions of the first and the second components, said insert being coated with an outer layer of adhesive tape based on polytetrafluoroethylene (PTFE) or other release material;

applying the insert along the recess by inserting the ridge between the radiused portions and placing the flat base in the plane in which the flange portions lie;

applying the at least one third component with the flat base against the portions of the flange of the first and second component and the flat base of the insert, whereby the first, second and third components form an uncured structural element having a longitudinal cavity which extends longitudinally through a nodal area of the structural element, said longitudinal cavity having a substantially triangular cross section with a substantially flat first side, provided by flat base of the third component, and two convex curved sides, provided by the first radiused portion of the first component and the second radiused portion of the second component, the convex curved sides having convexities facing a center of the longitudinal cavity and converging in a vertex;

after vacuum bagging, applying at least one programmed cycle of temperature and pressure in an autoclave to cure the uncured components;

upon completion of the curing step, allowing the cured structural element and said insert to cool and contract thermally, whereby the contraction of the resilient insert is greater than the contraction of the cured composite material and causes the cross section of the longitudinal cavity formed in the structural element to be slightly wider transversely than the transverse dimensions of said insert at ambient temperature; and longitudinally extracting said at least one insert from the longitudinal cavity of the structural element, thus obtaining a monolithic elongated structural element which forms at least one cavity extending longitudinally through the nodal area and having a shape corresponding to the shape of the insert.

* * * * *